United States Patent
Kim et al.

(10) Patent No.: US 11,122,191 B2
(45) Date of Patent: Sep. 14, 2021

(54) CAMERA MODULE AND PORTABLE TERMINAL

(71) Applicant: SAMSUNG ELECTRO-MECHANICS CO., LTD., Suwon-si (KR)

(72) Inventors: Byung Hyun Kim, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/751,273

(22) Filed: Jan. 24, 2020

(65) Prior Publication Data

US 2021/0136264 A1    May 6, 2021

(30) Foreign Application Priority Data

Nov. 4, 2019    (KR) .................. 10-2019-0139399

(51) Int. Cl.
*H04N 5/225*    (2006.01)
*G02B 5/28*    (2006.01)

(52) U.S. Cl.
CPC ........... *H04N 5/2254* (2013.01); *G02B 5/282* (2013.01)

(58) Field of Classification Search
CPC ........ G02B 1/11; G02B 1/118; G02B 5/0294; G02B 5/208; H04N 5/211; H04N 5/2176
See application file for complete search history.

(56) References Cited

U.S. PATENT DOCUMENTS

| | | | | |
|---|---|---|---|---|
| 6,356,389 B1* | 3/2002 | Nilsen | ................... | G02B 1/118 359/625 |
| 7,850,319 B2* | 12/2010 | Yoshikawa | ............ | G02B 5/003 359/614 |
| 2002/0008461 A1* | 1/2002 | Raj | ......................... | G02B 5/003 313/461 |
| 2005/0122589 A1* | 6/2005 | Bakker | ................... | G02B 1/11 359/591 |
| 2010/0244169 A1* | 9/2010 | Maeda | .............. | H01L 27/14685 257/432 |
| 2012/0147303 A1* | 6/2012 | Yamada | ................. | G02B 1/118 349/96 |
| 2013/0333693 A1* | 12/2013 | Hashimura | ......... | H01L 31/0547 126/714 |
| 2014/0049812 A1* | 2/2014 | Palanchoke | ............ | G02B 5/208 359/360 |
| 2015/0107582 A1* | 4/2015 | Jin | ........................... | G02B 5/22 126/676 |
| 2015/0311243 A1* | 10/2015 | Jin | ..................... | H04N 9/04557 348/302 |
| 2016/0109709 A1* | 4/2016 | Osterhout | ............... | G06F 3/013 359/614 |

(Continued)

FOREIGN PATENT DOCUMENTS

| | | |
|---|---|---|
| KR | 10-2012-0021065 A | 3/2012 |
| KR | 10-2012-0076969 A | 7/2012 |
| KR | 10-2017-0129195 A | 11/2017 |

*Primary Examiner* — Amy R Hsu
(74) *Attorney, Agent, or Firm* — NSIP Law (57) ABSTRACT

A camera module includes a lens imaging system including one or more lenses for imaging incident light on an imaging plane, a filter member disposed between the lens imaging system and the imaging plane, a first protrusion formed on a first surface of the filter member, and a second protrusion formed on a second surface of the filter member.

14 Claims, 9 Drawing Sheets

(56) References Cited

U.S. PATENT DOCUMENTS

| | | | |
|---|---|---|---|
| 2016/0146976 A1* | 5/2016 | Hung | G03F 7/0002 |
| | | | 428/141 |
| 2018/0045938 A1* | 2/2018 | Liu | G02B 21/0044 |
| 2018/0100957 A1* | 4/2018 | Ye | G02B 5/208 |
| 2019/0004222 A1* | 1/2019 | Hwang | G02B 5/201 |
| 2019/0285850 A1* | 9/2019 | Tan | G02B 13/005 |
| 2020/0064195 A1* | 2/2020 | Gallinet | G01J 3/1895 |

* cited by examiner

CAMERA MODULE AND PORTABLE TERMINAL

CROSS-REFERENCE TO RELATED APPLICATIONS

This application claims the benefit under 35 U.S.C. 119(a) of Korean Patent Application No. 10-2019-0139399 filed on Nov. 4, 2019, in the Korean Intellectual Property Office, the entire disclosure of which is incorporated herein by reference for all purposes.

BACKGROUND

1. Field

The present disclosure relates to a camera module and a portable terminal.

2. Description of the Background

A portable terminal may include a camera module. For example, a camera module for a video call may be disposed inside a display panel of a portable terminal. The camera module may include a configuration for blocking light having a specific wavelength. For example, the camera module may include an infrared block filter for blocking infrared light from being incident on an image sensor. The display panel disposed in front of the camera module and the infrared cutout filter disposed inside the camera module do not have refractive power, and thus they do not directly affect performance of the camera module.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens imaging system including one or more lenses to image incident light on an imaging plane, a filter member disposed between the lens imaging system and the imaging plane, a first protrusion formed on a first surface of the filter member, and a second protrusion formed on a second surface of the filter member.

The first protrusion and the second protrusion may have any one shape of a conical, a truncated conical, a pyramidal, and a truncated pyramidal shape.

The first protrusion and the second protrusion may have different sizes from each other.

A length of the first protrusion in an optical axis direction may be greater than a length of the second protrusion in the optical axis direction.

The first protrusion and the second protrusion may have different shapes from each other.

The first protrusion and the second protrusion may have different arrangement characteristics from each other.

The first protrusion may be formed at a greater number per predetermined unit of surface area than the second protrusion.

In another general aspect, a portable terminal includes a terminal body having a display panel on one surface thereof, a camera module disposed in a light transmissive region of the display panel, a first protrusion disposed on a first surface of the light transmissive region, and a second protrusion disposed on a second surface of the light transmissive region.

An area of the light transmissive region may be 1.5 to 2.0 times greater than an area of an incident pupil of the camera module.

The camera module may include a lens imaging system having one or more lenses to image incident light on an imaging plane, a filter member disposed between the lens imaging system and the imaging plane, a third protrusion formed on an object-side surface of the filter member, and a fourth protrusion formed on an image-side surface of the filter member.

The third protrusion and the fourth protrusion may have different sizes from each other.

The first protrusion to the fourth protrusion may have different sizes from each other.

The third protrusion and the fourth protrusion may have different arrangement characteristics from each other.

The first protrusion to the fourth protrusion may have different arrangement characteristics from each other.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

As demand for a camera module having higher resolution increases, a resolution degradation phenomenon due to a reflection phenomenon caused by the display panel and the infrared cutout filter may be a problem. The present disclosure relates to a camera module and a portable terminal capable of minimizing a resolution degradation phenomenon caused by a reflection phenomenon.

An aspect of the present disclosure is to provide a camera module and a portable terminal capable of minimizing a reflection phenomenon caused by a display panel and an infrared cutout filter.

Figure 1:
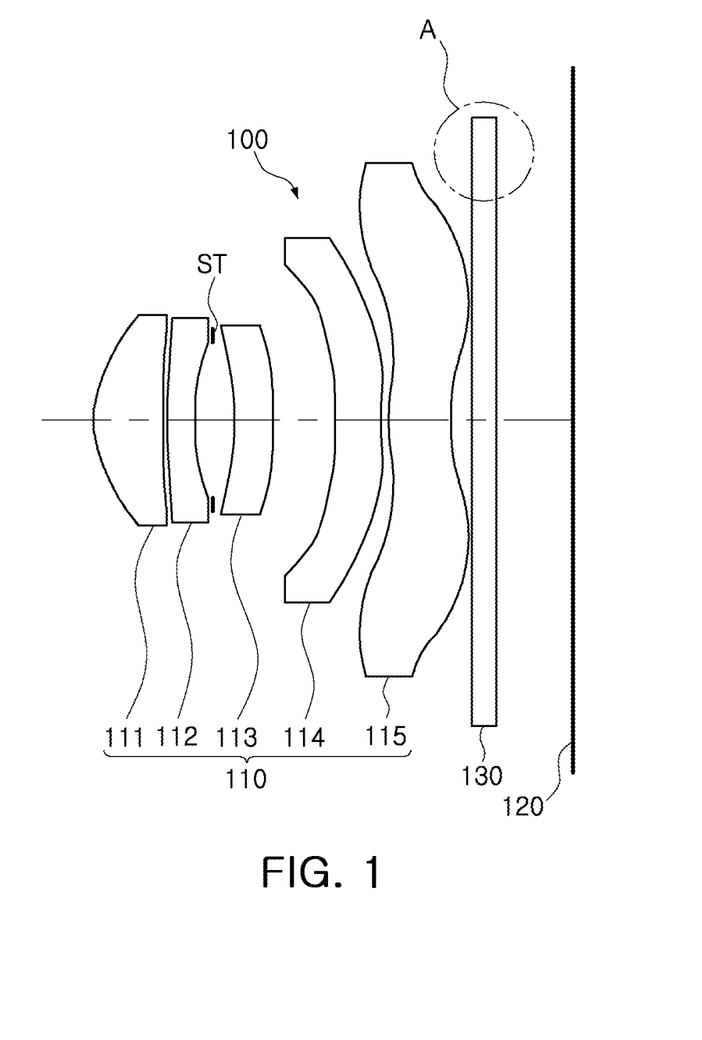
FIG. 1 is a configuration diagram of a camera module according to one or more examples of the present disclosure.

A camera module according to one or more examples will be described with reference to FIG. 1.

A camera module 100 may include a lens imaging system 110, an image sensor 120 constituting an imaging plane, and a filter member 130. However, a configuration of the camera module 100 is not limited to the above-described components. For example, the camera module 100 may further include a cover glass for protecting a surface of the image sensor 120.

The lens imaging system 110 includes a configuration for imaging light incident on the camera module 100 on the imaging plane of the image sensor 120. For example, the lens imaging system 110 may include one or more lenses. The lens imaging system 110 may be comprised of two or more lenses. For example, the lens imaging system 110 may be comprised of five lenses 111, 112, 113, 114, and 115, as illustrated in FIG. 1. The first lens 111 to the fifth lens 115 may each have a predetermined degree of refractive power. For example, the first lens 111 may have positive refractive power, the second lens 112 may have negative refractive power, the third lens 113 may have positive refractive power, the fourth lens 114 may have negative refractive power, and the fifth lens 115 may have positive refractive power. The first lens 111 to the fifth lens 115 may have a crystalline form. The first lens 111 may have a convex object side-surface and a concave image-side surface. The second lens 112 may have a convex object-side surface and a concave image-side surface. The third lens 113 may have a concave object-side surface and a convex image-side surface. The fourth lens 114 may have a concave object-side surface and a concave image-side surface. The fifth lens 115 may have a convex object-side surface and a concave image-side surface. The lens imaging system 110 may further include a stop ST. The stop ST may be disposed between the second lens 112 and the third lens 113.

The image sensor 120 may be configured to convert an optical signal into an electrical signal. For example, the image sensor 120 may convert image information incident through the lens imaging system 110 into electrical signal form. The image sensor 120 may be manufactured in CCD form.

The filter member 130 may be disposed between the lens imaging system 110 and the image sensor 120. The filter member 130 may be configured to block light of a predetermined wavelength from being incident on the image sensor 120. For example, the filter member 130 may be configured to block light of infrared wavelengths. For example, the filter member 130 may block light over a range of wavelengths.

The filter member 130 according to one or more examples may be configured to reduce a reflection phenomenon generated when light refracted by the lens imaging system 110 passes through the filter member 130. For example, protrusions may be formed on the first and second surfaces of the filter member 130, respectively. Such protrusions formed on the first and second surfaces of the filter member 130, respectively, reduce the reflection phenomenon compared to a comparative filter member without protrusions formed on the first and second surfaces.

Figure 2:
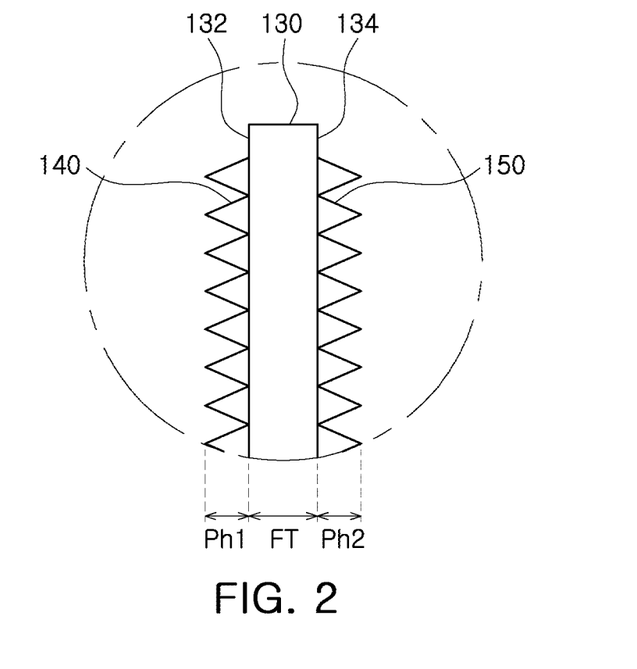
FIG. 2 is an enlarged view of one or more examples of a filter member illustrated in FIG.

A detailed structure of an example of the filter member 130 will be described with reference to FIG. 2.

A first protrusion 140 is formed on a first surface 132 of the filter member 130, and a second protrusion 150 is formed on a second surface 134 of the filter member 130. For reference, the first surface 132 refers to a surface closer to a subject or the lens imaging system 110, and the second surface 134 refers to an imaging plane or a surface closer to the image sensor 120.

The protrusions 140 and 150 may have an extended form in an optical axis direction. The first protrusion 140 and the second protrusion 150 are formed to have a predetermined size, respectively. For example, the first protrusion 140 and the second protrusion 150 may be formed to have the same or different sizes. As another example, the first protrusion 140 and the second protrusion 150 may be formed to have the same or different lengths. The first protrusion 140 and the second protrusion 150 may have a respective predetermined shape, respectively. For example, the first protrusion 140 and the second protrusion 150 may be configured to have the same or different shapes. The first protrusion 140 and the second protrusion 150 may have a predetermined arrangement characteristic, respectively. For example, the first protrusion 140 and the second protrusion 150 may have the same or different arrangement characteristics. As another example, the first protrusion 140 may be formed to be denser than the second protrusion 150. That is, the first protrusion 140 may be disposed at a greater number per predetermined unit of surface area than the second protrusion 150. The protrusions 140 and 150 may be configured to minimize an influence on an optical performance of the camera module 100. For example, heights Ph1 and Ph2 of the protrusions 140 and 150 may be less than a thickness FT of the filter member 130. Herein, the heights Ph1 and Ph2 of the protrusions 140 and 150, respectively, may also be referred to as the lengths, or lengths extending in the optical axis direction, of the protrusions 140 and 150, respectively.

Next, example protrusion forms formed on the filter member will be described with reference to FIGS. 3 to 6.

Figure 3:
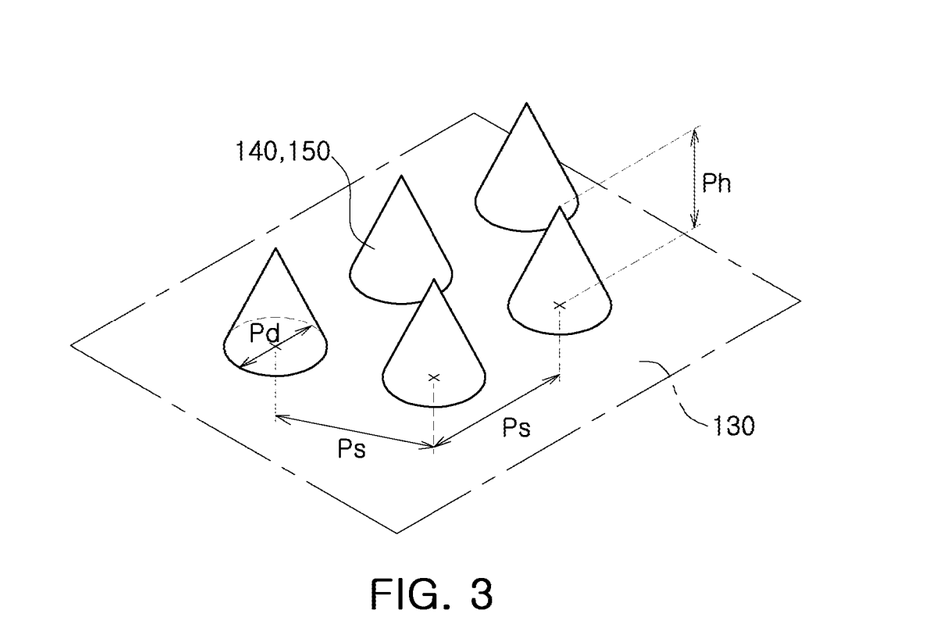
FIG. 3 is an enlarged view according to an example of the protrusion illustrated in FIG. 2.

The protrusions 140 and 150 may be formed to have a conical shape as illustrated in FIG. 3. Bottom surfaces of the protrusions 140 and 150 may have a circular shape having a predetermined diameter Pd. The protrusions 140 and 150 may be formed to have a predetermined height Ph. The height of the protrusion may also be referred to as the length, or length extending in the optical axis direction, of the protrusion. The protrusions 140 and 150 may be arranged at a predetermined interval Ps in a direction crossing the optical axis. Intervals between the neighboring protrusions 140 and 150 may be all the same.

Figure 4:
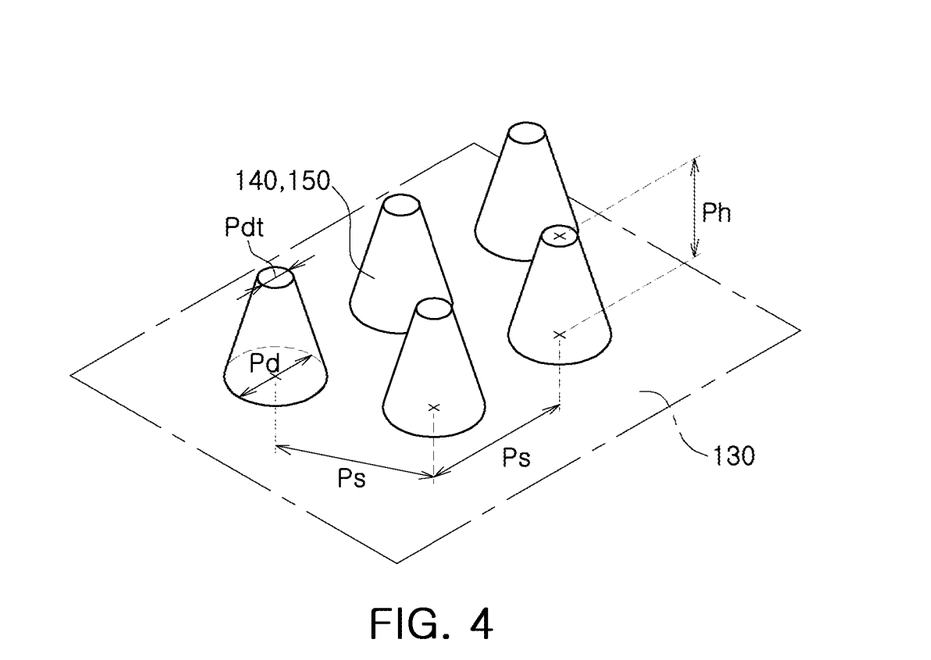
FIG. 4 is an enlarged view according to another example of the protrusion illustrated in FIG. 2.

The protrusions 140 and 150 may be formed to have a truncated conical shape as illustrated in FIG. 4. For example, bottom and upper surfaces of the protrusions 140 and 150 may have a circular shape having predetermined diameters Pd and Pdt, respectively. The protrusions 140 and 150 may be formed at a predetermined height Ph. The protrusions 140 and 150 may be arranged at a predetermined interval Ps in a direction crossing the optical axis. The intervals between the neighboring protrusions 140 and 150 may all be the same.

Figure 5:
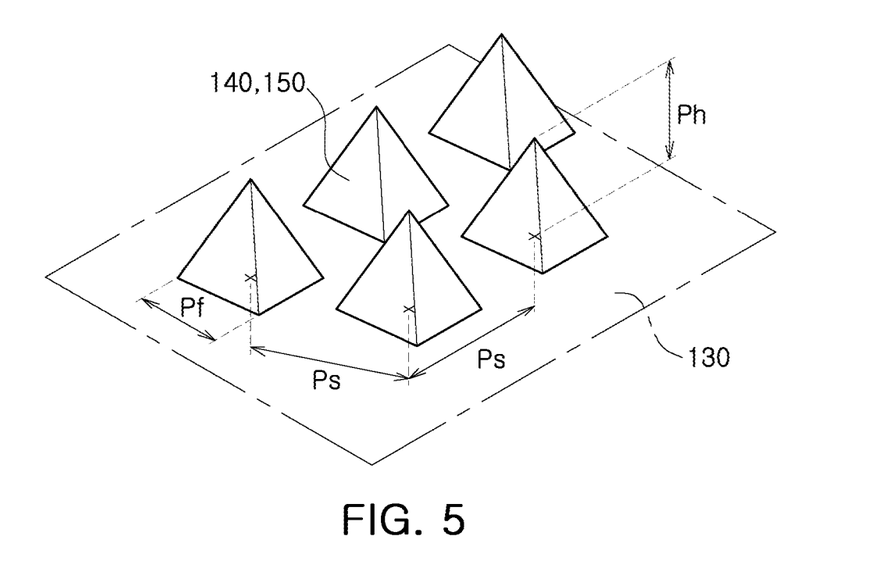
FIG. 5 is an enlarged view of another example of the protrusion illustrated in FIG. 2.

The protrusions 140 and 150 may be formed to have a pyramidal shape as illustrated in FIG. 5. Bottom surfaces of the protrusions 140 and 150 may be squares having a side length of Pf. The protrusions 140 and 150 may be formed at a predetermined height Ph. The protrusions 140 and 150 may be arranged at a predetermined interval Ps in a direction crossing the optical axis. The interval between the neighboring protrusions 140 and 150 may be all the same.

Figure 6:
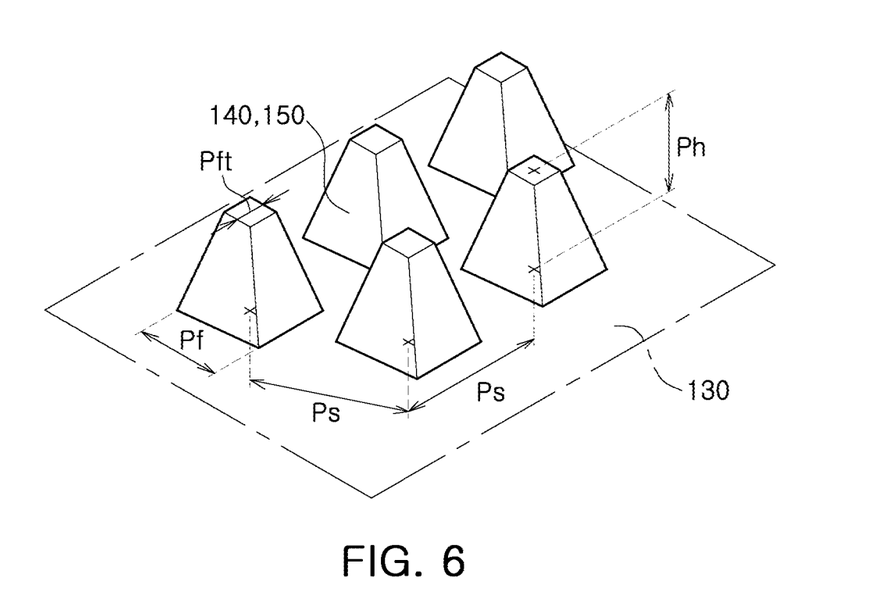
FIG. 6 is an enlarged view of another example of the protrusion illustrated in FIG. 2.

The protrusions 140 and 150 may be formed to have a truncated pyramidal shape as illustrated in FIG. 6. For example, bottom and upper surfaces of the protrusions 140 and 150 may be squares having side lengths of Pf and Pft, respectively. The protrusions 140 and 150 may be formed at a predetermined height Ph. The protrusions 140 and 150 may be arranged at predetermined intervals Ps in a direction crossing the optical axis. The interval between the neighboring protrusions 140 and 150 may be all the same.

The first protrusion 140 and the second protrusion 150 may be formed to have different forms. One or more example forms of the first protrusion 140 and the second protrusion 150 will be described with reference to FIGS. 7 to 10.

Figure 7:
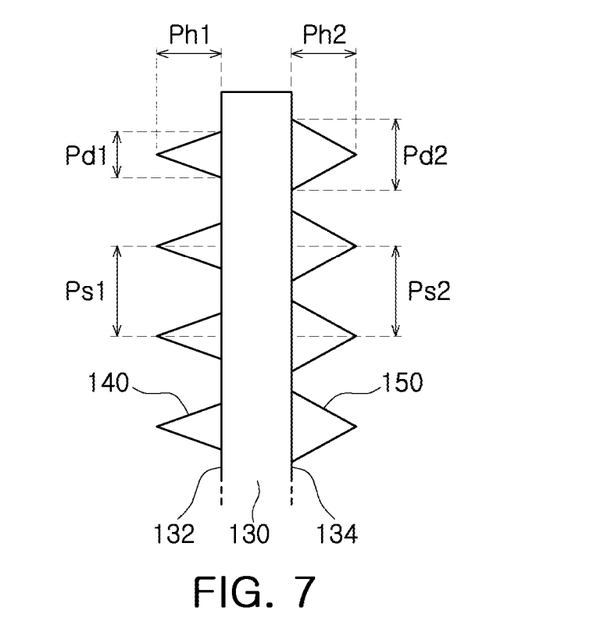
FIG. 7 is an enlarged view of a first protrusion and a second protrusion according to an example of the present disclosure.

The first protrusion 140 may have a different size from a second protrusion 150 as illustrated in FIG. 7. For example, a diameter Pd1 of the first protrusion 140 may be less than a diameter Pd2 of the second protrusion 150. However, a length Ph1 of the first protrusion 40 and a length Ph2 of the second protrusion 150 may be the same. In addition, an arrangement interval Ps1 of the first protrusion 140 and an arrangement interval Ps2 of the second protrusion 150 may also be the same.

Figure 8:
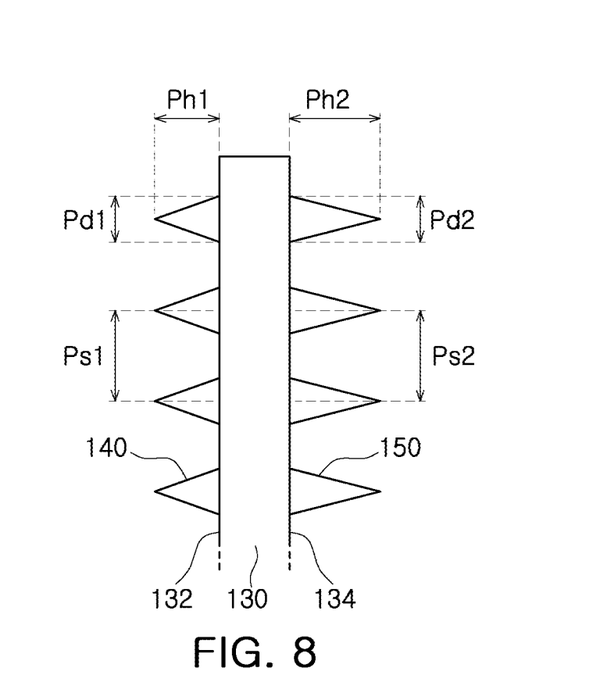
FIG. 8 is an enlarged view of another example of the first protrusion and the second protrusion.

The first protrusion 140 may have a different length from the second protrusion 150 as illustrated in FIG. 8. For example, the length Ph1 of the first protrusion 140 may be less than the length Ph2 of the second protrusion 150. However, the diameter Pd1 of the first protrusion 140 and the diameter Pd2 of the second protrusion 140 may be the same size. In addition, the arrangement interval Ps1 of the first protrusion 140 and the arrangement interval Ps2 of the second protrusion 150 may also be the same.

Figure 9:
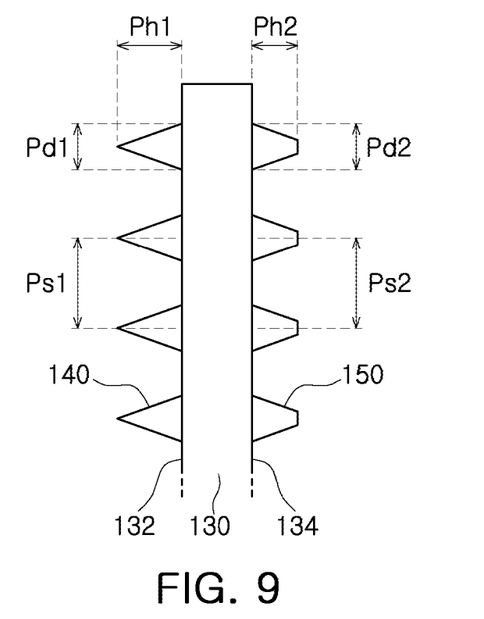
FIG. 9 is an enlarged view of another example of the first protrusion and the second protrusion.

As illustrated in FIG. 9, the first protrusion 140 may have a different shape from the second protrusion 150. For example, the first protrusion 140 may have a conical shape, and the second protrusion 150 may have a truncated conical shape. However, the length Ph1 of the first protrusion 140 and the length Ph2 of the second protrusion 150 may be the same. In addition, the diameter Pd1 of the first protrusion 140 and the diameter Pd2 of the second protrusion 150 may be the same size. In addition, the arrangement interval of the first protrusion 140 and the arrangement interval of the second protrusion 150 may also be the same.

Figure 10:
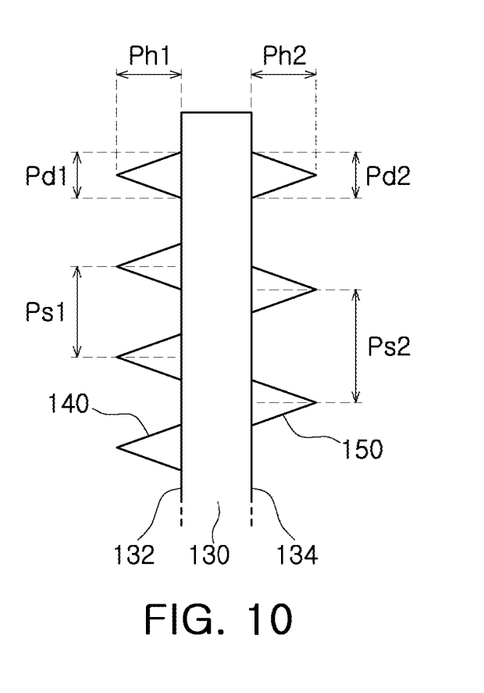
FIG. 10 is an enlarged view of another example of the first protrusion and the second protrusion.

As illustrated in FIG. 10, the first protrusion 140 may have a different arrangement interval from that of the second protrusion 150. For example, the arrangement interval Ps1 of the first protrusion 140 may be less than the arrangement interval Ps2 of the second protrusion 150. However, the length Ph1 of the first protrusion 140 and the length Ph2 of the second protrusion 150 may be the same. In addition, the diameter Pd1 of the first protrusion 140 and the diameter Pd2 of the second protrusion 150 may be the same size.

Figure 11:
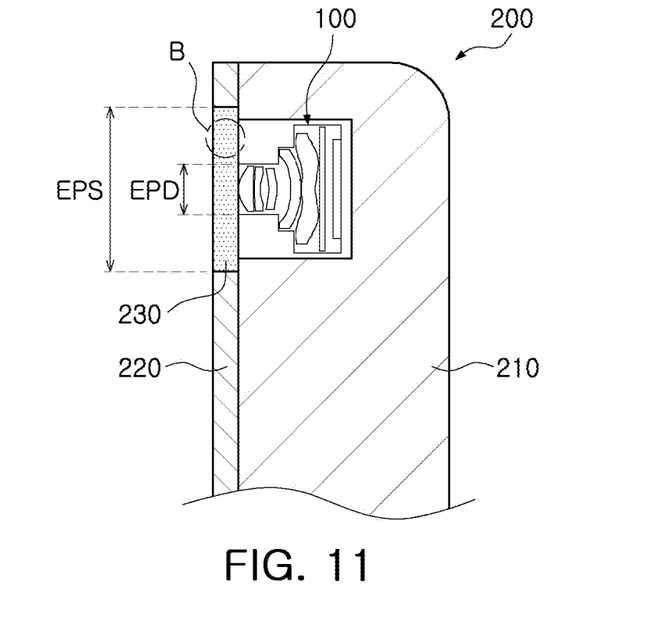
FIG. 11 is a configuration diagram of a portable terminal according to one or more examples of the present disclosure.

Next, a portable terminal according to one or more examples will be described with reference to FIG. 11.

A portable terminal 200 includes a camera module 100. For example, one or more camera modules 100 may be mounted on a terminal body 210 of the portable terminal 200. The portable terminal 200 may include a display panel 220. The display panel 220 may be disposed on one surface of the terminal body 210. The display panel 220 may include a region through which light may pass. For example, a light transmissive region 230 may be formed in the display panel 220. The light transmissive region 230 may be formed in front of the camera module 100. The light transmissive region 230 may be formed to have a predetermined size. For example, an incident pupil EPS of the light transmissive region 230 may be greater than an incident pupil EPD of the camera module 100. An area of the incident pupil EPS of the light transmissive region 230 may be 1.5 to 2.0 times larger than an area of the incident pupil EPD of the camera module 100.

The display panel 220 according to the present embodiment is configured to reduce a reflection phenomenon. For example, protrusions may be formed on first and second surfaces of the light transmissive region 230 in the display panel 220.

Figure 12:
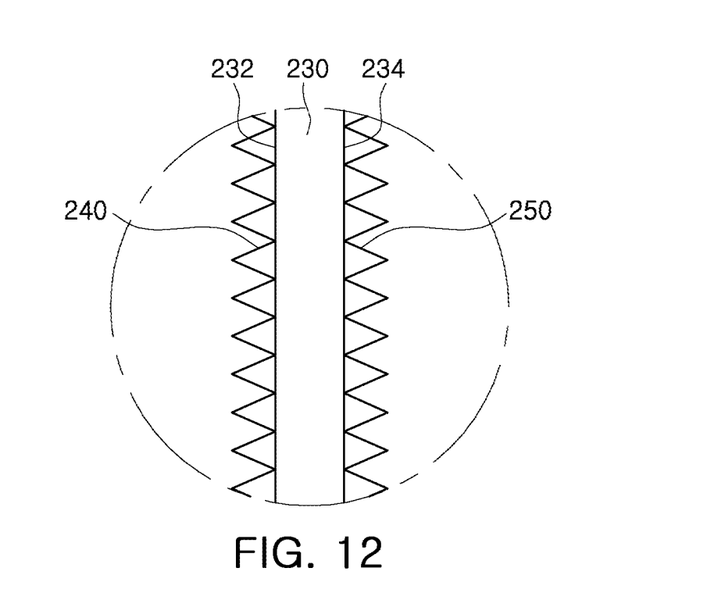
FIG. 12 is an enlarged view of an example display panel illustrated in FIG. 11.

A detailed structure of an example of the light transmissive region 230 will be described with reference to FIGS. 11 and 12.

A first protrusion 240 may be formed on a first surface 232 of the light transmissive region 230, and a second protrusion 250 may be formed on a second surface 234 of the light transmissive region 230. For reference, the first surface 232 refers to a surface closer to a subject than the second surface 234, and the second surface 234 refers to a surface closer to the camera module 100 than the first surface 232.

The protrusions 240 and 250 may have a shape extended in an optical axis direction. The first protrusion 240 and the second protrusion 250 may be formed to have a predetermined size, respectively. For example, the first protrusion 240 and the second protrusion 250 may be formed to have the same or different sizes. As another example, the first protrusion 240 and the second protrusion 250 may be formed to have the same or different lengths. The first protrusion 240 and the second protrusion 250 may have a predetermined shape, respectively. For example, the first protrusion 240 and the second protrusion 250 may be configured to have the same or different shapes. The first protrusion 240 and the second protrusion 250 may have a predetermined arrangement characteristic, respectively. For example, the first protrusion 240 and the second protrusion 250 may have the same or different arrangement characteristics. As another example, the first protrusion 240 may be formed to have a denser distribution per predetermined unit of surface area than the second protrusion 250. The protrusions 240 and 250 may be configured to minimize an influence on an optical performance of the camera module 100. For example, heights Th1 and Th2 of the first protrusions 240 and the second protrusions 250 may be less than a thickness of the display panel 220. Herein, the heights Th1 and Th2 of the first protrusions 240 and the second protrusions 250, respectively, may also be referred to as the lengths, or lengths extending in the optical axis direction, of the protrusions 240 and 250, respectively.

The first protrusion 240 and the second protrusion 250 may be formed to have different forms. Examples of forms of the first protrusion 240 and the second protrusion 250 will be described with reference to FIGS. 13 and 14.

Figure 13:
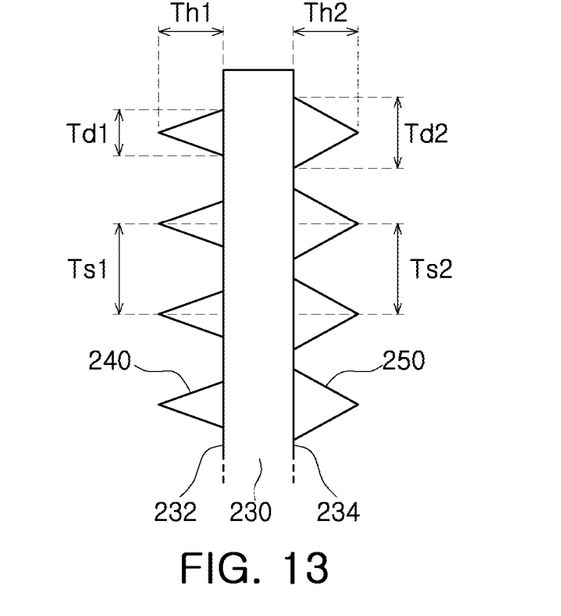
FIG. 13 is an enlarged view according to an example of the first protrusion and the second protrusion illustrated in FIGS. 11 and 12.

As illustrated in FIG. 13, the first protrusion 240 may have a different size from the second protrusion 250. For example, a diameter Td1 of the first protrusion 240 may be less than a diameter Td2 of the second protrusion 250. As another example, the length Th1 of the first protrusion 240 may be less than or greater than the length Th2 of the second protrusion 250. The arrangement interval Ts1 of the first protrusion 240 and the arrangement interval Ts2 of the second protrusion 250 may also be different.

Figure 14:
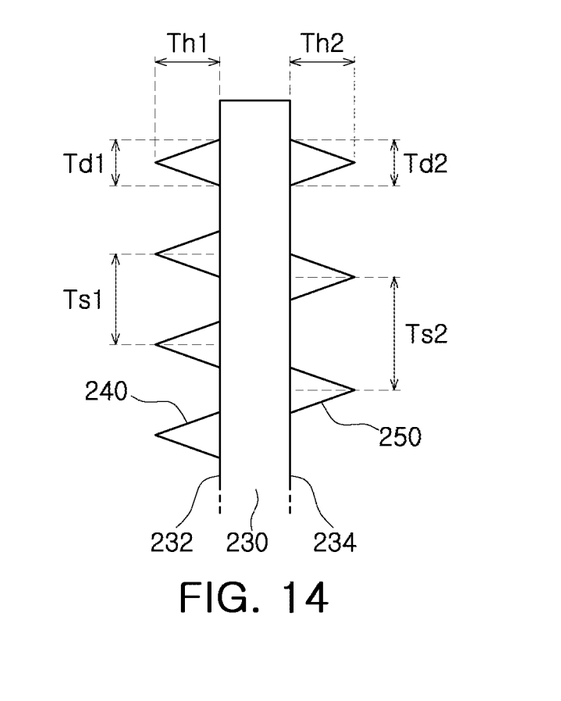
FIG. 14 is an enlarged view according to another example of the first protrusion and the second protrusion illustrated in FIG. 12.

As illustrated in FIG. 14, the first protrusion 240 may have a different arrangement interval from the second protrusion 250. For example, the arrangement interval Ts1 of the first protrusion 240 may be less than the arrangement interval Ts2 of the second protrusion 250. However, the length Th1 of the first protrusion 240 and the length Th2 of the second protrusion 250 may be the same. In addition, the diameter Td1 of the first protrusion 240 and the diameter Td2 of the second protrusion 250 may have the same size.

Figure 15:
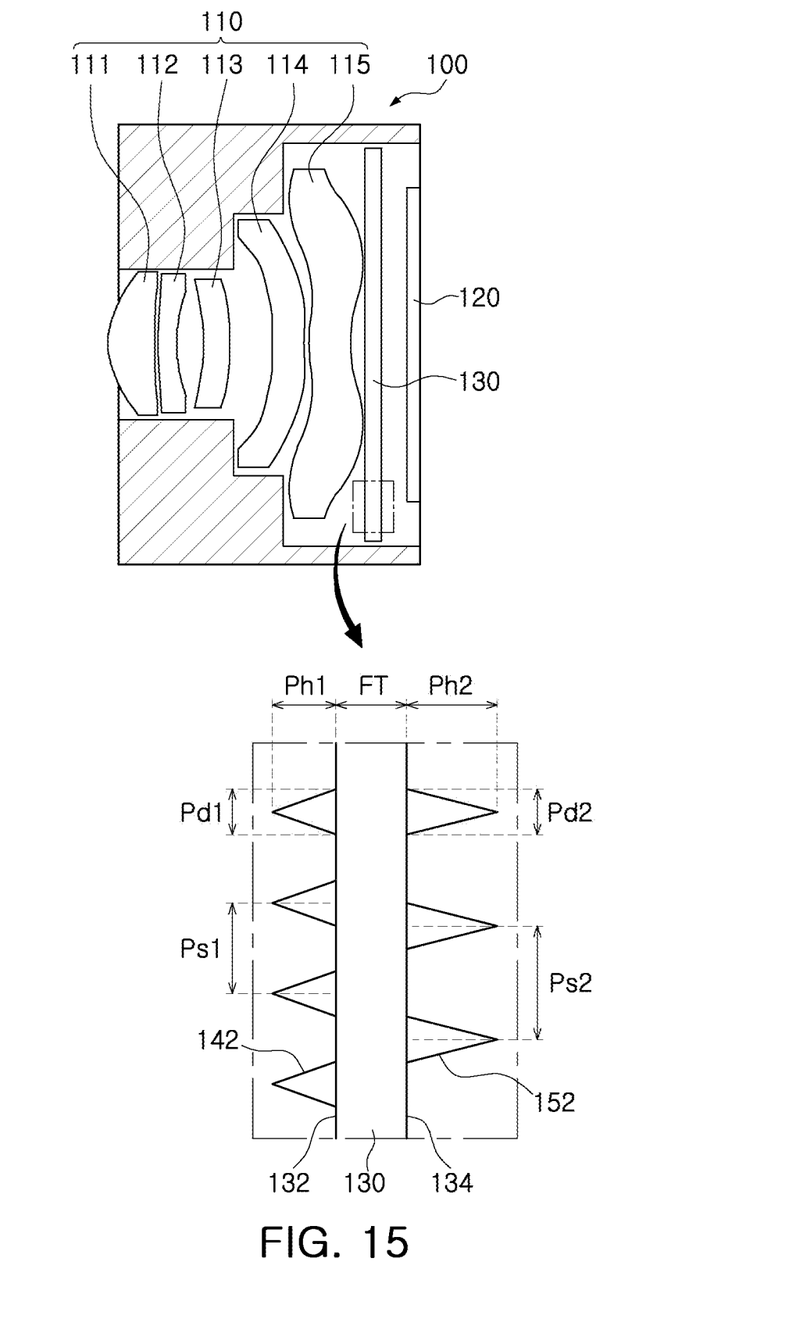
FIG. 15 is an enlarged view of an example camera module illustrated in FIG. 11.

Next, one or more examples of a camera module 100 mounted on the portable terminal 200 will be described with reference to FIG. 15.

The camera module 100 may include a lens imaging system 110, an image sensor 120 constituting an imaging plane, and a filter member 130. However, a configuration of the camera module 100 is not limited to above-described components. For example, the camera module 100 may further include a cover glass for protecting a surface of the image sensor 120.

The lens imaging system 110 includes a configuration for imaging light incident on the camera module 100 on an imaging plane of the image sensor 120. For example, the lens imaging system 110 may include one or more lenses. The lens imaging system 110 may be comprised of two or more lenses. For example, the lens imaging system 110 may be comprised of five lenses 111, 112, 113, 114, and 115, as illustrated in FIG. 15. The first lens 111 to the fifth lens 115 may have predetermined refractive power. For example, the first lens 111 may have positive refractive power, the second lens 112 may have negative refractive power, the third lens 113 may have positive refractive power, the fourth lens 114 may have negative refractive power, and the fifth lens 115 may have positive refractive power. The first lens 111 to the fifth lens 115 may have a crystal shape. The first lens 111 may have a convex object-side surface and a concave image-side surface. The second lens 112 may have a convex object-side surface and a concave image-side surface. The third lens 113 may have a concave object-side surface and a convex image-side surface. The fourth lens 114 may have a concave object-side surface and a concave image-side surface. The fifth lens 115 may have a convex object-side surface and a concave image-side surface. The lens imaging system 110 may further include a stop ST. The stop ST may be disposed between the second lens 112 and the third lens 113.

The image sensor 120 may be configured to convert an optical signal into an electrical signal. For example, the image sensor 120 may convert an image information incident through the lens imaging system 110 into electrical signal form. The image sensor 120 may be manufactured in CCD form.

The filter member 130 may be disposed between the lens imaging system 110 and the image sensor 120. The filter member 130 may be configured to block light of a predetermined wavelength from being incident on the image sensor 120. For example, the filter member 130 may be configured to block light of infrared wavelengths.

The filter member 130 according to the present example may be configured to reduce a reflection phenomenon generated when light refracted by the lens imaging system 110 passes through the filter member 130. For example, protrusions may be formed on the first and second surfaces of the filter member 130, respectively.

The protrusions 140 and 150 may be formed on both surfaces of the filter member 130. For example, a third protrusion 142 may be formed on a first surface 132 (object-side surface) of the filter member 130, and a fourth protrusion 152 may be formed on a second surface 134 (image-side surface) of the filter member 130.

The third and fourth protrusions 142 and 152 may have an extended form in an optical axis direction. The third protrusion 142 and the fourth protrusion 152 may be formed to have a predetermined size, respectively. For example, the third protrusion 142 and the fourth protrusion 152 may be formed to have the same or different lengths. In the present embodiment, the length Ph1 of the third protrusion 142 is less than the length Ph2 of the fourth protrusion 152. The third protrusion 142 and the fourth protrusion 152 may have a predetermined shape, respectively. For example, both the third protrusion 142 and the fourth protrusion 152 may have a conical shape. The third protrusion 142 and the fourth protrusion 152 may have a predetermined arrangement characteristic, respectively. The third protrusion 142 and the fourth protrusion 152 may have the same or different arrangement intervals. For example, the arrangement interval Ps1 of the third protrusion 142 may be greater than or less than the arrangement interval Ps2 of the fourth protrusion 152. The third protrusion 142 and the fourth protrusion 152 may have an arrangement interval the same or different from that of the first protrusion 240 and the second protrusion 250. For example, the arrangement interval Ts1 of the first protrusion 240 may be less than the arrangement interval Ts2 of the second protrusion 250, the arrangement interval Ts2 of the second protrusion 250 may be less than the arrangement interval Ps1 of the third protrusion 142, and the arrangement interval Ps1 of the third protrusion 142 may be less than the arrangement interval Ps2 of the fourth protrusion 152.

The third protrusion 142 and the fourth protrusion 152 may be formed to have the same or different sizes from those of the first protrusion 240 and the second protrusion 250 formed in the light transmissive region 230 of the display member 220. For example, the length Th1 of the first protrusion 240 may be less than the length Th2 of the second protrusion 250, the length Th2 of the second protrusion 250 may be less than the length Ph1 of the third protrusion 142, and the length Ph1 of the third protrusion 142 may be less than the length Ph2 of the fourth protrusion 152. However, a size relationship between the protrusions 240, 250, 142, and 152 is not limited to the above-described form. For example, the length Th1 of the first protrusion 240 may be greater than the length Th2 of the second protrusion 250, the length Th2 of the second protrusion 250 may be greater than the length Ph1 of the third protrusion 142, and the length Ph1 of the third protrusion 142 may be greater than the length Ph2 of the fourth protrusion 152.

As set forth above, according to the present disclosure, a resolution degradation phenomenon caused by a reflection phenomenon occurring in a light transmissive member may be minimized.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a lens imaging system comprising one or more lenses to image incident light on an imaging plane;
   a filter member disposed between the lens imaging system and the imaging plane;
   a first protrusion formed on a first surface of the filter member; and
   a second protrusion formed on a second surface of the filter member,
   wherein the first protrusion and the second protrusion comprise different sizes from each other.

2. The camera module of claim 1, wherein the first protrusion and the second protrusion comprise any one shape of a conical, a truncated conical, a pyramidal, and a truncated pyramidal shape.

3. The camera module of claim 1, wherein a length of the first protrusion in an optical axis direction is greater than a length of the second protrusion in the optical axis direction.

4. The camera module of claim 1, wherein the first protrusion and the second protrusion comprise different shapes from each other.

5. The camera module of claim 1, wherein the first protrusion and the second protrusion comprise different arrangement characteristics from each other.

6. The camera module of claim 5, wherein the first protrusion is formed at a greater number per predetermined unit of surface area than the second protrusion.

7. A portable terminal, comprising:
   a terminal body comprising a display panel on one surface thereof;

a camera module disposed in a light transmissive region of the display panel;

a first protrusion disposed on a first surface of the light transmissive region; and a second protrusion disposed on a second surface of the light transmissive region, wherein the first protrusion and the second protrusion comprise different sizes from each other.

8. The portable terminal of claim 7, wherein the first protrusion and the second protrusion comprise different arrangement characteristics from each other.

9. The portable terminal of claim 7, wherein an area of the light transmissive region is formed to be 1.5 to 2.0 times greater than an area of an incident pupil of the camera module.

10. The portable terminal of claim 9, wherein the third protrusion and the fourth protrusion comprise different arrangement characteristics from each other.

11. The portable terminal of claim 10, wherein the first protrusion to the fourth protrusion comprise different arrangement characteristics from each other.

12. The portable terminal of claim 7, wherein the camera module comprises, a lens imaging system comprising one or more lenses to image incident light on an imaging plane;

a filter member disposed between the lens imaging system and the imaging plane;

a third protrusion formed on an object-side surface of the filter member; and a fourth protrusion formed on an image-side surface of the filter member.

13. The portable terminal of claim 12, wherein the third protrusion and the fourth protrusion comprise different sizes from each other.

14. The portable terminal of claim 13, wherein the first protrusion to the fourth protrusion comprise different sizes from each other.

\* \* \* \* \*